Aug. 13, 1968

W. H. WILKINSON ET AL 3,396,605

DRIVE AXLE

Filed Feb. 3, 1966

INVENTORS
WILLIAM H. WILKINSON
JOHN R. THORSON

BY

*A. H. Caser*

ATTORNEY

Aug. 13, 1968  W. H. WILKINSON ET AL  3,396,605
DRIVE AXLE

Filed Feb. 3, 1966  2 Sheets-Sheet 2

INVENTORS
WILLIAM H. WILKINSON
JOHN R. THORSON
BY
*A. H. Caser*
ATTORNEY

3,396,605
DRIVE AXLE

William H. Wilkinson, Upper Arlington, Ohio, and John R. Thorson, Phoenix, Ariz., assignor to Mobil Oil Corporation, a corporation of New York
Filed Feb. 3, 1966, Ser. No. 524,710
7 Claims. (Cl. 74—650)

ABSTRACT OF THE DISCLOSURE

An improved automotive drive axle or rear-wheel drive, is provided, for transmitting power from a propeller shaft to the rear wheels of an automotive vehicle or machine. In the drive axle, a viscoelastic liquid is employed to transmit power, the liquid being confined between one or more pairs of coaxial discs or plates which provides radial power transmitting surfaces.

---

This invention relates to an automotive drive axle, or rear-wheel drive, for transmitting power from the propeller shaft to the rear wheels of an automotive vehicle or machine. It particularly relates to a drive axle in which a viscoelastic liquid is employed to transmit power, the liquid being confined between one or more pairs of coaxial discs or plates which provide radial power transmitting surfaces.

The invention is characterized by the fact that the drive axle not only provides equal-torque differential action but also a limited-slip action, i.e., an action wherein slipping of a rear wheel, as occurs when the wheel rests on ice or mud, is confined to a limited extent after which the drive axle itself supplies a corrective action, such action comprising increasing the tractive effort supplied by the non-slipping wheel. The invention is further characterized by a desirable self-modulating operation in that the liquid used not only transmits propeller shaft power but also controls the power by balancing the torque delivery to each rear wheel. The drive axle employs only two of the gears conventionally used, namely, the drive pinion and the ring gear, the others being replaced by the plates and liquid, and thus a mechanically simplified drive unit is provided. In addition, the liquid furnishes auxiliary lubricating and cooling effects, these being additional to its main purpose. Furthermore, by virtue of its construction the drive unit is no larger than conventional differential gear units, exhibits reduced noise, is less subject to wear, and is freer from the effects of shock loading. Other advantages may become apparent from the ensuing description.

In essence, the drive axle comprises a pair of separate or split axles each connectable at its outer end portion to a wheel and each having one or more axially movable plates or discs on its inner end portion. Means are provided for preventing actual or metal contact between the innermost plate of one axle and the corresponding plate of the other axle. Each plate may rotate relatively to the other. A rotatable drum encloses the plates and is provided with a pair of axially aligned bearings in which the axles are disposed. The drum has a plate opposite each axle plate so as to form between such opposed plates a pair of power transmitting radial surfaces. The axial length of the drum is somewhat greater than that of the plates so that a narrow clearance is provided between the surfaces of each said pair of power transmitting surfaces. Filling these clearances is a viscoelastic liquid which is characterized, when subjected to a rotary stress, by undergoing rotary shear and producing a force which is normal to the power transmitting surfaces. Gear means are provided on the outer surface of one side of the drum engageable by a propeller drive shaft, and in this way the drum is rotated. A stationary housing encloses the drum and also the axial bearings thereof, and is provided with alined openings through which the axles extend. This housing also has an opening for receiving the propeller drive shaft.

The invention may be better understood by referring to the accompanying drawings wherein.

Figure 1:
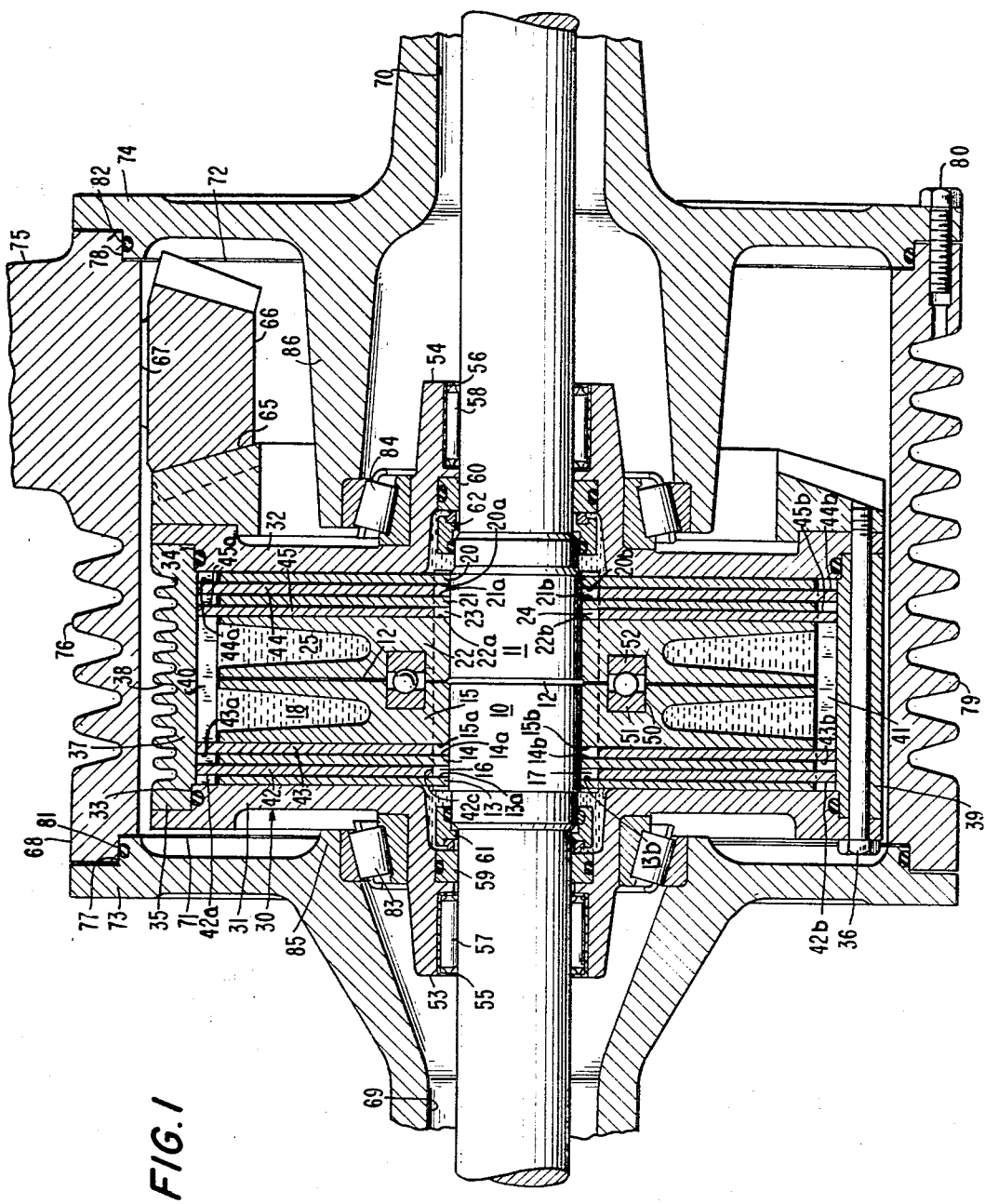
FIG. 1 is a cross-sectional view, looking down, of the drive axle with parts of the construction broken away.

In FIG. 1 the drive axle comprises a pair of separate or split axles 10, 11 each of which is connectable at its outer end portion to a wheel not shown and at its inner end portion is slightly spaced from the other axle, as at 12. Axle 10 has a group of axially spaced, axially movable plates or discs 13, 14, and 15 suitably mounted thereon as by means of a pair of oppositely disposed keys 16 and 17 on the axle which enter keyways at 13a, 13b, 14a, 14b, 15a, and 15b in the plates. The plates are preferably flat or near flat, circular, substantially parallel to each other, and coaxially disposed on the axle. Plate 15 is substantially thicker than the others and is provided with a circumferentially extending recess or groove 18 which opens through its edge, the purpose of which is to serve as a reservoir for the viscoelastic liquid.

On axle 11 a similar arrangement of axially spaced, axially movable plate 20, 21 and 22 are disposed, being mounted thereon by interengaging keys and keyways, the former indicated at 23 and 24 and the latter at 20a, 20b, 21a, 21b, 22a and 22b. Plate 22 has the thick construction of plate 15 and is similarly grooved at 25.

Enclosing both groups of plates is a rotatable drum or housing 30 comprising a pair of end plates 31, 32, each having a circumferentially extending shoulder 33, 34 on its inner side provided with oil seals as shown. An annular rim or ring 35 interfits on the shoulders 33, 34 and is secured to the end plates 31, 32 as by spaced circumferentially extending bolts, one of which is shown at 36. Also spaced circumferentially of the rim 35 is a series of arc-shaped portions, one of which is shown at 37, having serrations 38 the purpose of which is to help dissipate heat. Each portion 37 alternates with an arc-shaped portion through which a bolt extends, one of which is shown at 39.

As shown, portions 37 and 39 are directly opposed to each other, being 180° apart. Each of these carries a key 40, 41, respectively, which extends radially inwardly, and mounted for axial movement on these keys are two groups of axially spaced plates, one group comprising plates 42 and 43 which extend toward the axle 10, and the other group comprising plates 44 and 45 which extend toward axle 11. These plates are provided with keyways, indicated at 42a, 42b, 43a, 43b, 44a, 44b, 45a, and 45b. It will be seen that each plate 42, 43, 44 and 45 has an axial opening the diameter of which is just large enough to clear the keys on the axles. For example, the plate 42 has an axial opening, indicated at 42c, whose diameter is slightly larger than that of axle 10 plus the width of keys 16 and 17.

As shown, plates 42 and 43, which for convenience may be designated drum plates, are interleaved with plates 13, 14 and 15, designated axle plates, and similarly, drum plates 44 and 45 are interleaved with axle plates 20, 21 and 22. Walls 31 and 32 may also be considered as plates, and it will be seen that plate 13 is interleaved between wall or plate 31 and plate 42, while plate 20 is interleaved between wall or plate 32 and plate 44.

Figure 2:
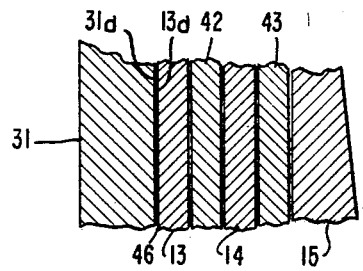
FIG. 2 is an enlarged fragmental view of a detail of FIG. 1.

It will be seen that the adjacent radial surfaces of each pair of interleaved plates form a pair of power-transmitting surfaces, and as best shown in FIG. 2, a narrow clearance is present between the surfaces of each said pair. Thus, considering the interleaved plates 13 and 31, the paired power-transmitting surfaces are seen at 13d and 31d, and the clearance at 46. Similar clearances are present between interleaved plates 13 and 42, 42 and 14, 14 and 43, and 43 and 15. As indicated, all of these clearances inside drum 30, including the reservoirs 18 and 25, are occupied by viscoelastic liquid.

Plates 15 and 22, comprising the innermost plates on axles 10 and 11, respectively, are spaced apart by a narrow gap 12 in order to prevent actual or metallic contact of the kind that would wear or gall the plates. Suitably the gap is filled with liquid to provide a lubricating action and, as described hereinafter, to transfer torque under special or extraordinary conditions. Any suitable means may be employed to space plates 15 and 22 apart, and/or to maintain between them a liquid film of suitable thickness, and in the embodiment shown such means comprise a bearing, specifically a thrust bearing 50. Both rings of the bearing are tightly mounted, ring 51 being set in plate 15 and ring 52 in plate 22. Bearing 50 thus balances any opposed axially directed forces of the plates, i.e., the axial force of the plates on axle 10 is balanced by that of the plates on axle 11. It is also apparent that the bearing permits rotation of the plates on one axle relatively to those on the other. By maintaining a fixed spacing between plates 15 and 22, the bearing minimizes any torque transfer between the two axles under normal conditions, i.e., conditions of equal or nearly equal axle speeds as may be encountered for example in normal straight line motion.

Drum 30 has a pair of axially aligned extensions 53 and 54 in which are openings 55, 56 through which the axles extend. In the outer portions of these openings are roller bearings 57 and 58, inwardly of which are sealing rings 59, 60 and 61, 62.

Gear means in the form of ring gear 65 is fixedly mounted, as by bolts 36, on the outer surface of one side of drum 30, and is engaged by drive pinion 66 attached to the propeller shaft 67. Rotation of the propeller shaft thus turns the drum 30. A stationary housing 68 encloses the drum and the extensions 53 and 54 thereof. Housing 68, which has a generally cylindrical form, has access openings 71 and 72 which are closed by plates 73 and 74; the latter having hubs or hub openings 69, 70, respectively, through which the axles extend. Housing 68 has integrally formed therewith a housing 75 for the propeller drive shaft, and is provided with serrations 76, 79 to help dissipate heat. As shown, the housing 68 provides shoulders 77 and 78 for end plates 73 and 74. These end plates may be secured to the housing as by means of bolts, one of which is shown at 80. It will be noted that shoulders 77 and 78 are provided with oil sealing rings 81, 82.

Drum 30 is spaced from the housing 68, and is supported relatively thereto by tapered bearings 83, 84. These bearings also support the inwardly extending hub portions 85, 86 of end plates 73, 74. The bearings thus firmly position the drum with respect to the housing and prevent relative movement therebetween. It will be understood that conventional lubricant is placed in the spaces between the drum and the housing.

Figure 3:
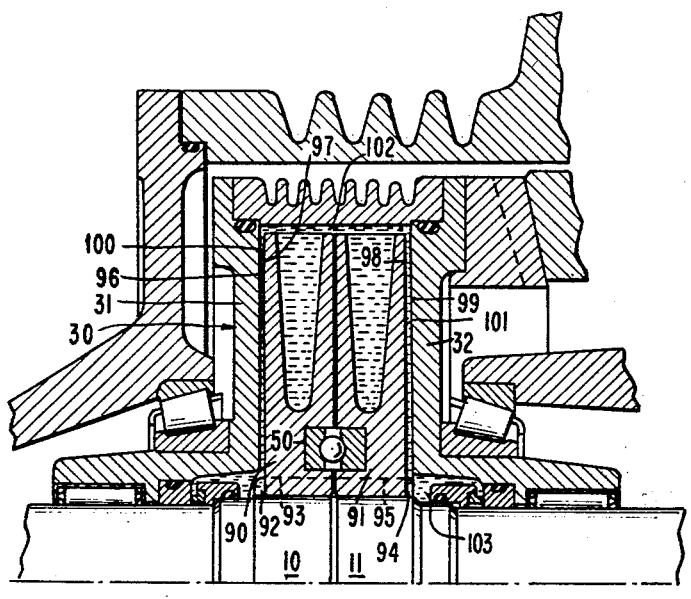
FIG. 3 is a view like FIG. 1, but showing only a part of the construction and illustrating a modification.

In FIG. 3 the construction differs from FIG. 1 in that only one plate is present on each axle and the rotatable drum has only one plate interleaved with the axle plate. As much of the construction is the same as that of FIG. 1, the same reference numerals are used for identical structures.

Each axle 10, 11 has an axially movable plate 90, 91, respectively, mounted thereon by means of an interengaging key and keyway 92, 93 and 94, 95. The plates are preferably of substantial thickness, are preferably flat or near flat, circular, substantially parallel to each other, and coaxially disposed on the axles. The thrust bearing 50 serves the same function as in FIG. 1 and is similarly mounted. Plates 31 and 32 of the drum, comprising the end walls thereof, are interleaved with plates 90, 91 to provide pairs of radial power transmitting surfaces 96, 97 and 98, 99 between which are the clearances 100 and 101, respectively. Circumferential clearance 102 is provided. The interconnecting clearances 100, 101, and 102, together with the spaces, as at 103, form a reservoir for the viscoelastic liquid.

In other respects the construction of FIG. 3 is like that of FIG. 1.

As may be apparent, the number of plates on an axle which interleaves with a drum plate to provide a pair of power-transmitting surfaces is variable. In FIG. 3 there is one such plate while in FIG. 1 there are three. The number may also be two, or four, or more. Generally, a plurality of such plates is preferred as the increased power transmitting surfaces thus afforded means that less torque is required at each interface and permits a viscoelastic liquid of reduced viscosity to be used. By an "interface" is meant a pair of opposed power-transmitting surfaces. Less torque at each interface, in turn, enables less massive structures to be used, while a reduction in viscosity of the liquid helps increase its speed of flow in the narrow clearances. On the other hand, a construction employing fewer axle plates has the advantage of mechanical simplification. In respect of the dimensions of the drive axle, it is comparable in size to conventional bevel gear differentials and may employ conventional drive pinions and ring gears. The number of drum and axle plates is variable, as described, and so too is the area of the power-transmitting surfaces of the plates. A useful range of the area of one side of a plate is 25 to 125 sq. in., which is to be regarded as illustrative rather than limiting. The clearances between the plates are also variable and may range from normal manufacturing clearances of the order of 0.01 inch to larger clearances of the order of 0.1 inch. It will be appreciated that in the smaller clearances contemplated herein the liquid may be in the form of a film. The drive axle is suitable for use in any self-propelled vehicle or machine in which power is transmitted to a pair of axles.

Turning now to the liquid employed inside the rotatable drum, it is described as viscoelastic, by which is meant a liquid which exhibits both viscous and elastic behavior; thus it has flow properties of a liquid and elastic properties of a solid. Besides being viscoelastic, the liquid is one which exhibits the phenomenon already described, namely, during rotary shear, as brought about by the application of a rotary shearing stress, it produces a force normal to the described power transmitting surfaces. The direction of this force will become clear from the following consideration: consider a pair of flat, circular, substantially parallel, coaxially disposed plates separated from each other by a small uniform gap which is filled with a liquid of the kind under consideration. If one of the plates is rotated relatively to the other, the normal forces produced express themselves as forces which try to move the plates further apart. This may illustrate the direction of the forces. It should also be noted that the normal forces occur along the common axis of rotation of the plates and also are distributed radially from the center of each plate to the periphery. The normal forces are greatest along the common axis and decrease steadily as one moves toward the periphery. At the periphery the normal forces are about zero. Summarizing, the normal forces are normal to the opposed radial surfaces of the plates; the forces occur along the axis of rotation of the plates and are radially distributed from such axis to the periphery; and the force is greatest along the axis of rotation and zero at the periphery. It will be understood that references to normal force have the foregoing significance.

The liquid is of course a viscous one, for it is by virtue of this property that the driving plates transmit motion through the liquid film to the driven plates. This type of drive is per se conventional, being known as a viscous-drag drive. A viscous liquid is required for a strong normal force effect.

An example of a suitable liquid is a 5% by weight solution in mineral oil of polyisobutylene of a viscosity average molecular weight of $1.23 \times 10^6$. The mineral oil has a kinematic viscosity of 108 centistokes at 100° F. and 9.5 centistokes at 210° F., and a molecular weight of 462. This solution exhibits an apparent viscosity ranging from 1,000 down to about 20 poises at 77° F. and shear rates in the range of 1 to 10,000 reciprocal seconds, and an apparent viscosity ranging from 100 down to 4 poises at 167° F. and shear rates in the range of 1 to 10,000 reciprocal seconds. Plots of apparent viscosity versus shear rate at these various temperatures show curves of sigmoid shape, indicating that the liquid is a pseudoplastic type of non-Newtonian material. At shear rates ranging from about 10 to 1,000 reciprocal seconds, and at temperatures of 77 to 167° F., the liquid exhibits a normal force, expressed as lbs. of total thrust, ranging from about 0.2 to about 6.4 lbs. when tested in a modified Ferranti-Shirley cone-plate rheogoniometer having a cone type shearing element of a radius of only 1.58 inches, a cone angle of 21″, and a maximum speed of only about 30 r.p.m. At any fixed temperature, this relationship between normal force and shear rate is a linear one for this liquid. On scale up, the foregoing value of 6.4 lbs. of thrust (measured at 77° F., 30 r.p.m., and 500 reciprocal seconds) stop would reach a maximum of 64 lbs. on increasing the radius of the cone to 5 inches, and if the rotary speed were increased 10 times to 300 r.p.m., the shear rate would increase to 5,000 reciprocal seconds, and the thrust, which increases linearly with shear rate, would increase to 640 lbs. It is thus apparent that the liquid is capable of a normal force of substantial value.

Of interest in the foregoing connection is the fact that when the shear zone of the rheogoniometer is filled with the foregoing liquid, i.e., 5% solution of polyisobutylene in mineral oil, the rotary speed of the shearing element varies linearly with the normal force, i.e., the normal force increases with increasing speed of the shearing element. If such linear relation is for any reason not desired, it may be changed as by choosing a liquid which exhibits a non-linear shear rate-normal force relation. It is also interesting to note that while the shear stress applied to the foregoing liquid, and also to other liquids, increases with the shear rate, the normal force increases with the shear rate even more rapidly. Thus, at a shear rate of 100 reciprocal seconds, the normal force may be about 10 times greater than the shear stress.

With a liquid of the foregoing type present inside drum 30, the operation of the drive axle may be considered briefly. In normal straight line motion of the wheels of the vehicle, rotation of drum 30 serves to drive the driven plates, and therefore the axles and wheels, through the effect of the large viscous drag of the liquid. The driving plates turn at substantially the same speed as the driven plates, and thus little rotary stress is being applied to the liquid in the clearances; what little rotary stress that is applied produces a small normal force effect which acts to equalize the clearances between the plates. It may be mentioned that at start up, the applied rotary stress would be greater, and the resulting normal force would be greater, but the force on one axle half would oppose that on the other axle half and the net effect would be to equalize the clearances.

In normal turning motion of the wheels, the driven plates are again moved by the effect of viscous drag, but in this case another effect is present owing to the fact that one wheel travels at a greater speed than the other. Keeping in mind that the purpose of the thrust bearing 50 is to maintain a fixed spacing between plates 15 and 22, let it be assumed, referring to FIG. 1, that a turn is made in which the right wheel travels slower than the left, i.e., a right turn. This means that the plates on the axle 11 are rotating slower than those on the axle 10, and that the plates on axle 11 have a greater speed-difference with the drum plates than do the plates on axle 10. A moment's consideration may show that this is so; thus, while the plates on axle 10 are rotating faster than those on axle 11, they are not rotating faster than the drum plates, for it is the latter which are driving the axle plates. The other possibilities are that the plates on axle 10 are rotating at the same speed as, or slower than, the drum plates. The probability is that the plates on axle 10 are rotating somewhat more slowly than the drum plates, and the resulting speed-difference is less than the speed-difference existing between the plates of axle 11 and the corresponding drum plates. Owing to the greater speed-difference on the right, the liquid in the clearances of the right hand plates is subjected to a rotary shearing stress, such that the liquid undergoes rotary shear and produces a force which is normal to the power-transmitting surfaces of the involved plates. This rotary stress is greater than any which may then be applied to the liquid in the clearances of the left hand plates, and in consequence the normal force effect on the right hand side exceeds any on the left hand side. Therefore, the normal force produced on the right is directed towards the left, i.e., from a region of higher stress to one of lower stress, and this force has the effect of moving the plates towards the left, thus increasing the clearances on the right side and decreasing those on the left side. The effect of this action is to re-establish an equal distribution of torque to both axles, as discussed in the next paragraph.

As will be understood, before the start of turning movement in the vehicle, i.e., while it was in normal straight line motion, the torque to both axles was equal. The torque to each axle varies directly with the speed-difference between the axles and the drum and inversely with the width of the clearances; thus, the torque increases with increasing axle-drum speed-difference and decreases with increasing width of clearances, and vice versa. If T is torque, omega is axle-drum speed-difference, and $h$ is width of clearance, the foregoing relation can be summarized as follows:

T is proportional to omega/$h$

Turning movement, however, increases the axle-drum speed-difference on one side and decreases it on the other, thus interrupting the condition of equal torque distribution. In the right side turning movement under consideration, the axle-drum speed-difference on the right is greater than that on the left, so that the torque to the right side exceeds that to the left. The drive axle responds to this interruption of equal torque distribution by producing the normal force, as described, which acts to increase the clearances on the right side and decreases those on the left so that the torque to the right side decreases and the torque to the left side increases until both are nearly equal. When turning movement of the vehicle is completed, the wheel speeds and axle-drum speed-difference become the same, and also the clearances, and thus there is equal torque to both sides.

Where the wheels are on a slippery surface, such as ice or mud, and one wheel, say the right one, slips while the left retains traction, the rotation of the drum will apply a rotary stress to the liquid in the clearances on the left or traction side. Since the axle-drum speed-difference on the left is larger than on the right, the applied stress on the left is larger than any stress which may then be applied on the right side. This larger stress induces rotary shear in the liquid and a normal force is produced which acts to drive the plates to the right, thus increasing the clearances on the left or traction side and decreasing them on the right or slipping side. The effect of this action is to increase the axle-drum speed-difference on the left side, and also to increase the speed-difference between axle plates 15 and 22. By virtue of the last mentioned speed-difference the liquid in the space 12 between plates 15 and 22 undergoes shear, and it is thus possible for the tractive effort or torque transmitted through the right side plates to be transferred through the liquid in space 12, i.e., through the viscous drag effect thereof, to the left or traction side plates. Thus, the tractive effort to the left side is increased to such an extent as to move the tractive wheel out of the ice or mud. When both wheels have traction again, the clearances on each side become equal, as do the axle speeds, and normal operation resumes.

It may be of interest to note that in normal operation, such as normal straight line motion, the thrust bearing 50 allows small speed-differences to occur between plates 15 and 22 without producing a significant viscous drag effect. It is apparent, however, that in extraordinary operation, as where one wheel loses traction, the liquid in the space 12 may produce a drag effect of significance.

Besides the liquid described, a number of other viscoelastic liquids which exhibit the normal force phenomenon are available and may be chosen from both aqueous and non-aqueous systems. They include solutions of high polymers in non-aqueous solvents, high polymers in liquid form, and solutions of certain soaps dissolved in hydrocarbon solvents. More particularly, the liquids include polyisobutylene in mineral oil, poly(alkyl methacrylates) in mineral oil or in dimethylphthalate, polyisobutylene in Decalin or in o-dichlorobenzene, rubber in xylene or in benzene, polystyrene in Decalin or in dimethylphthalate, methylcellulose or sodium carboxymethylcellulose in water, aluminum or calcium soaps of fatty or naphthenic acids dissolved in hydrocarbons, glue in water, etc.

The viscosity of the liquid should not be so high as to hinder its flow under the influence of the prevailing forces. On the other hand the viscosity should be high enough to provide the necessary viscous drag effect. It will be understood that the transfer of torque by viscous drag does not involve the normal force effect. The liquid should produce a normal force sufficient to enable the liquid to produce the described axial movements, but not so high as to exceed the strength of the drum or its parts or the capacity of bearing 50.

Desirably the liquids should have an apparent viscosity in the range of about 1 to 1000 poises or more at a shear rate in the range of about 10,000 to 1 reciprocal seconds; and they may exhibit a normal force of up to several hundred pounds of thrust, or from a few tenths, or even hundredths, to one or two hundred p.s.i. These are illustrative values.

As an example, consider an automobile weighing 3700 lbs., having a wheel rolling radius of 13 inches, and having maximum power to the drive axle of 120 HP. A suitable drive axle for this car, constructed as in FIG. 1, has three driving plates alternated with three driven plates, making a total of five pairs of power transmitting surfaces for each axle half. Each plate has a radius of about 9.0 cm., measured to the outside of the active liquid zone, and a radius of 2.5 cm. measured to the inside of the active liquid zone. These dimensions substantially define a plate of about 9.0 cm. radius having a central aperture of about 2.5 cm. radius. The clearances range from just above 0 to 0.025 cm. with an average clearance of 0.0125 cm. The amount of liquid required is about ⅛ gallon and has an apparent viscosity of about 1000 poises at a shear rate of one reciprocal second.

The term "automotive" is intended to refer to a vehicle or machine that propels itself and in which the present drive axle may be useful, including automobiles, trucks, buses, tractors, military vehicles, etc.

The term "outer," as used in connection with points along the drive axle, refers to points disposed toward the attached wheel, while "inner" refers to points disposed toward the drum 30.

The term "liquid" means all fluids other than gases.

It will be understood that the invention is capable of obvious variations without departing from its scope.

In the light of the foregoing description, the following is claimed:

1. An automotive drive axle device comprising a pair of separate axles each connectable at its outer end to a wheel and each having an axially movable plate on its inner end portion, means for maintaining said inner plate on one axle out of actual contact with the corresponding plate on the other axle, a rotatable drum enclosing said plates and having a pair of axially alined openings in which said axles are disposed, said drum having a plate opposite each said axle plate so as to form therebetween a pair of power transmitting radial surfaces, the axial length of the drum being greater than the corresponding length of said plates so that a narrow clearance is present between said power transmitting surfaces of each said pair, a viscoelastic liquid in said clearances characterized, when subjected to a rotary stress, by undergoing rotary shear and producing a force normal to said power transmitting surfaces, gear means on the outer surface of one side of the drum engageable by a propeller drive shaft for rotating said drum, a stationary housing enclosing said drum and axially alined openings and having openings through which said axles extend, and said housing also having an opening for receiving said propeller drive shaft.

2. The automotive drive axle device of claim 1 wherein said gear means comprise spacing means.

3. The automotive drive axle device of claim 2 wherein said spacing means comprise a liquid film between said inner plates.

4. The automotive drive axle device of claim 2 wherein said spacing means comprise a bearing.

5. The automotive drive axle device of claim 1 wherein each axle has a plurality of axially spaced, axially movable plates on its inner end and, interleaved therewith, a plurality of axially spaced, axially movable plates on said drum, thereby to increase said radial power transmitting surfaces.

6. The automotive drive axle device of claim 5 wherein said axle plates are keyed to each axle and said drum plates are keyed to the drum.

7. An automotive drive axle device comprising a pair of separate axles each connectable at its outer end portion to a wheel and each having a plurality of axially spaced, axially movable plates on its inner end portion, the innermost plate of one axle being disposed immediately opposite the inner most plate of the other axle, bearing means between said innermost plates for maintaining the same out of actual contact, said bearing means permitting the plates on one axle to rotate relatively to the plates on the other, a rotatable drum enclosing the plates of both axles and having a pair of axially alined bearings through which said axles extend, said drum having two groups of axially spaced, axially movable plates of which the plates of one group are interleaved with the plates of one axle and the plates of the other group are interleaved with the plates of the other axle, the adjacent radial surfaces of each pair of interleaved plates forming therebetween a pair of power transmitting surfaces, each said pair of power transmitting surfaces having a narrow clearance therebetween, a viscoelastic fluid in said clearances characterized, when subjected to a rotary stress, by undergoing rotary shear and producing a force normal to said power transmitting surfaces, gear means on the outer surface of one side of the drum engageable by a propeller drive shaft for rotating said drum, a stationary housing enclosing said drum and axially alined bearings and having openings through which said axles extend, and said housing also having an opening for receiving said propeller drive shaft.

References Cited

UNITED STATES PATENTS

| | | | |
|---|---|---|---|
| 1,238,447 | 8/1917 | Severy | 74—650 |
| 2,079,724 | 5/1937 | Van Ranst. | |
| 2,576,156 | 11/1951 | Trofimov. | |
| 2,684,743 | 7/1954 | Trofimov. | |
| 2,883,884 | 4/1959 | Norton. | |
| 3,071,225 | 1/1963 | Blau et al. | |

FRED C. MATTERN, JR., *Primary Examiner.*

T. R. HAMPSHIRE, *Assistant Examiner.*